June 7, 1966 E. W. RONAI 3,254,549
TUBE CUTTING MEANS FOR TUBE WINDING MACHINES
Filed Sept. 21, 1960 3 Sheets-Sheet 1

INVENTOR.
ERNEST WINSTON RONAI
BY
ATTORNEY.

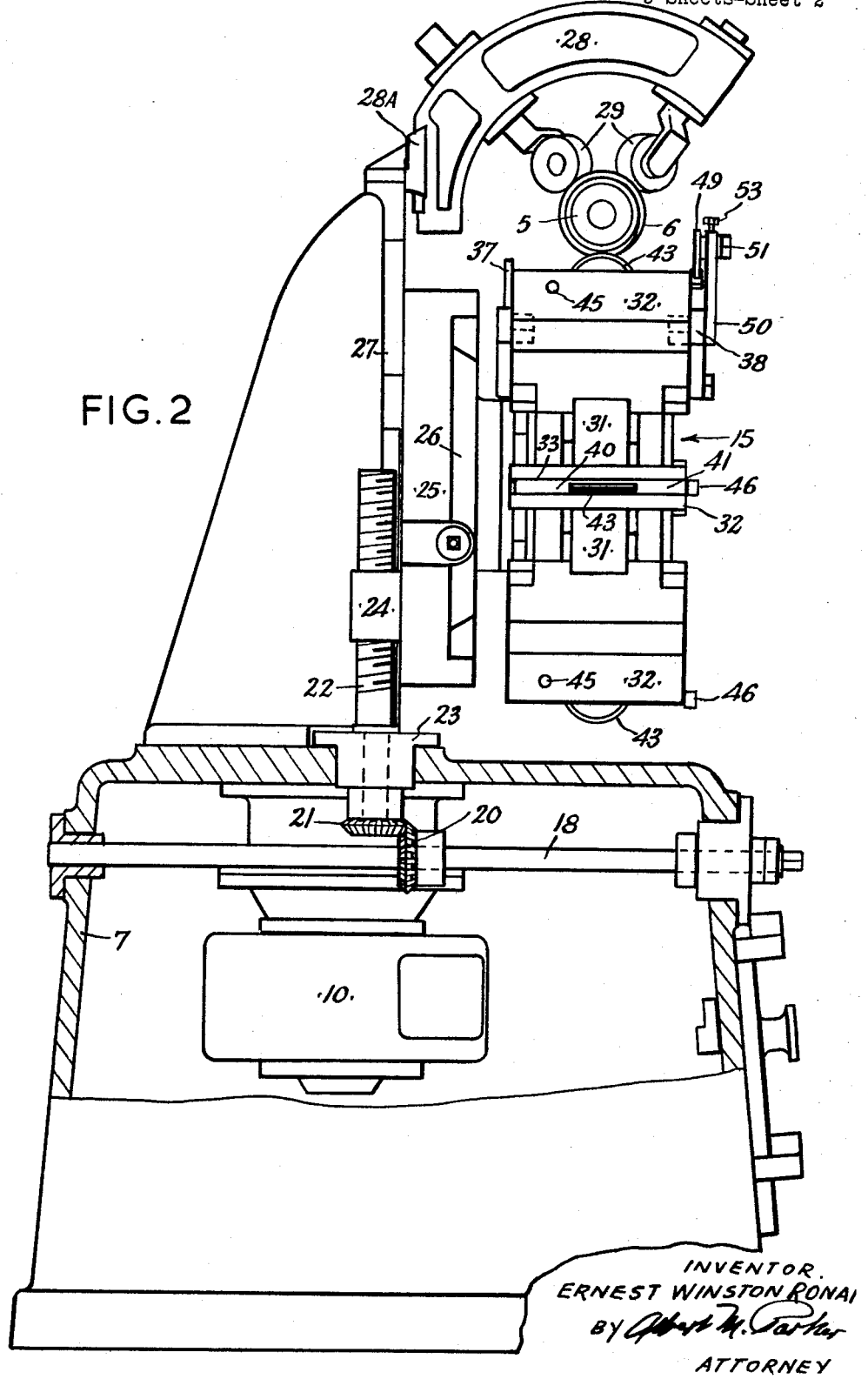

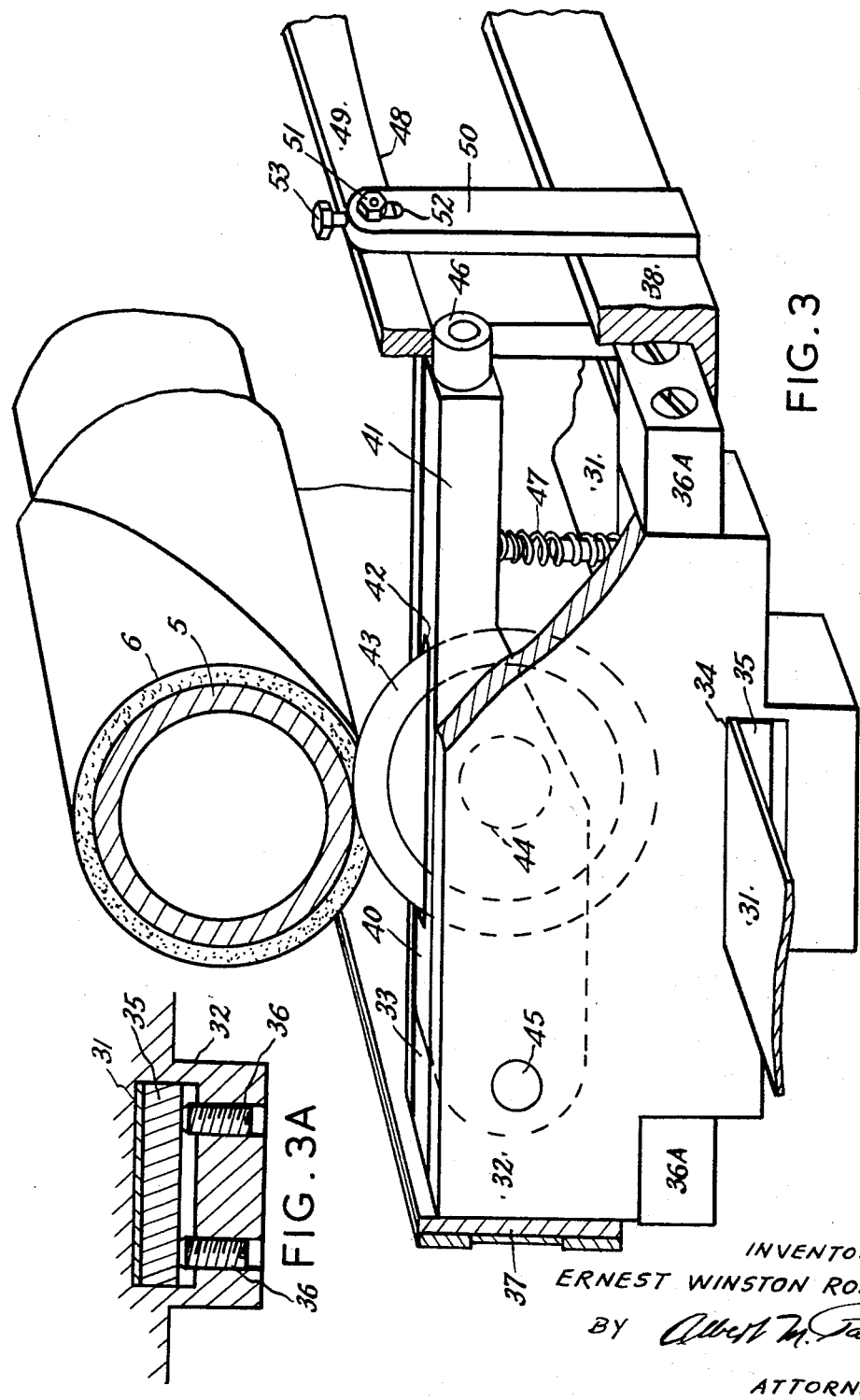

United States Patent Office 3,254,549
Patented June 7, 1966

1

3,254,549
TUBE CUTTING MEANS FOR TUBE WINDING MACHINES
Ernest Winston Ronai, Castlecrag, near Sydney, New South Wales, Australia
Filed Sept. 21, 1960, Ser. No. 57,449
6 Claims. (Cl. 82—98)

This invention relates to automatic tube cutting means for machines for the manufacture of helically wound tubes with which said invention is adapted to be used.

The known forms of tube cutting means consist of one or more cutters suitably mounted on a slide, which travels in the direction of the tube being formed. At appropriate timing the cutter or cutters move towards the tube, sever it, then retract, after which the slide reverses its movement and returns to its starting position. In this cutting means, the appreciable masses involved in the slide and cutter or cutters and their driving mechanism represent a considerable moment of inertia which has to be brought to nil at the end of each operating cycle. This results in loss of power, and tear and wear on the driving mechanism providing the reciprocating motion of the slide.

The present invention has been specially devised to provide means whereby the above stated disabilities are obviated, and the said means are of strong and reliable form, whereby the cutting of the wound tubes as same are formed by a tube winder is automatically effected in a much improved manner than before with a minimum of movement. Adjustments can be readily made to suit requirements, and other advantages afforded will be apparent from the following description.

According to this invention, the automatic tube cutting machine adapted for use with a tube winder of known form, is characterized by an endless conveyor of flexible form mounted for traversing under a secondary revolving mandrel providing a base for the cutting of a formed tube advanced from the said tube winder, said endless conveyor being drive connected to an actuating source, and having a series of transversely positioned cutter carriers affixed thereto at intervals apart, and each cutter carrier including a pivoted cutter of sharpened edge disc form mounted in place in a manner whereby each can be advanced to the work and retracted therefrom, and means associated with said endless conveyor for effecting the advancing of the said cutters in succession as the said endless conveyor is traversed to present the said cutters to a wound tube on the mentioned mandrel to perform the cutting operation, after such cutting the cutters being retracted, the speed of traverse of said endless conveyor being synchronised with the speed with which the helically formed tube from the tube winder is advanced along the secondary mandrel, and the spacing of the cutter carriers governing the distance between cuts.

In one construction, the cutter carriers each embody a cell pivoted in place at one end while the other end is free and spring loaded so as to be advanced outwardly and retracted against such spring loading, and having a cutter pivoted in ech cell and projecting therefrom.

The means for advancing and retracting each cell with its cutter, may consist of a roller cam arranged at the free end of each cell and adapted to co-act with a suitably contoured cam track arranged along the top of the endless conveyor at one side thereof.

2

The endless conveyor has provision for adjusting it within fine limits in a vertical plane.

The cutter carriers may be arranged on the endless conveyor so that they can be adjusted therealong.

In order to describe the invention more fully reference will now be made to the accompanying drawings, wherein:

FIGURE 2 is an enlarged end elevation of same shown partly in section, and FIGURE 3 is an enlarged perspective view showing a cutting element and associated parts with a portion of the tube included in the severing operation.

FIGURE 3A is a fragmentary side sectional view of the lower portion of a cutter carrier to show the affixture to the conveyor belt.

Figure 1:
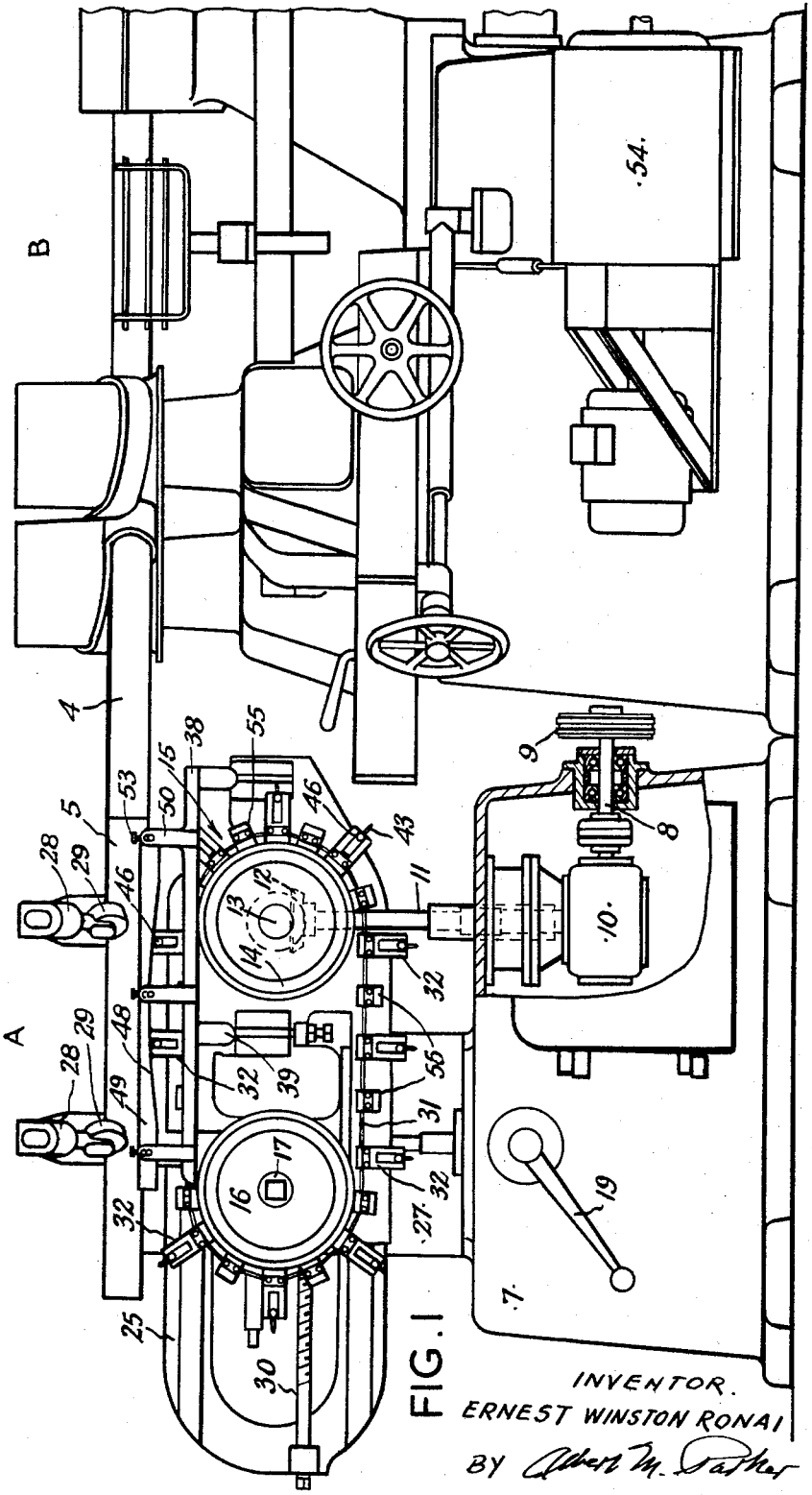
FIGURE 1 is a front elevation of the automatic tube cutting machine shown in register with a helical tube winding machine of known form.

In FIGURE 1 the reference B indicates generaly a helical tube winding machine of known form and the reference A indicates the present automatic tube cutting machine arranged at one side of said winding machine, and the primary or winding mandrel 4 being connected with the secondary or cutoff mandrel 5 of revolving type forming a base for the cutting of a tube 6 advanced therealong. Both the primary or winding mandrel 4 and the secondary or cutoff mandrel 5 are cantilever supported at the winder ends thereof by any suitable means well known in the art.

Now returning to the automatic tube cutting machine, this has a hollow cabinet form of base 7 (hereinafter termed base 7) flanged to seat on a floor or the like and has mounted therein at one end in suitable bearings a drive shaft 8 connected by a pulley 9 (seen in FIGURE 1) and belt means with an electric motor (not shown) arranged on the back of the base 7, and said shaft 8 connects also through bevel gearing in housing 10 with a vertically disposed transmission shaft 11 gear connected at 12 (see FIGURE 1) to operate the driven shaft 13 on which mounting pulley 14 of the endless conveyor generally indicated by reference 15 is affixed and passes about a loose mounting pulley 16 on shaft 17, and these parts will be later further referred to.

For vertical adjustment of the conveyor 15 a spindle 18 is mounted for rotation across the base 7 and has a shaped end for the reception of a turn handle 19 as shown in FIGURE 1. Other means of actuation may however, be employed and the invention is not limited to this precise manual form of positioning.

The spindle 18 has a bevel gear 20 thereon meshing a pinion 21 on the end of a vertical lead screw 22 mounted in bearing 23 and has a sleeve nut 24 thereon connected to frame 25 on which the conveyor base 26 is carried. Said frame 25 is mounted on an upstanding back structure 27 on the base 7 and at the top a pair of arcuate brackets 28 extends forwardly on a mounting rail 28A and each said bracket mounts two supporting rollers 29 adapted to contact the tube 6 on the secondary mandrel 5 to prevent deflection of that mandrel, and said brackets 28 can be adjusted along the rail 28A.

A longitudinal lead screw 30 is arranged on the front of the back 25 in suitable bearings for tensioning the conveyor 15 by sliding the bearing (not shown) of the loose pulley shaft 17 in either direction.

The conveyor 15 includes a suitable frame structure upon which the parts are mounted and is affixed to the base 26. The base 26 is fixed to the frame 25 and extends laterally outwardly therefrom with a suitable support for the shaft 13 on a fixed axis. The loose pulley shaft 17 is mounted on a sliding carriage (not shown) which permits adjustment of the spacing between the axes of shafts 13 and 17 by means of the lead screw 30 which operates in any suitable manner well known to a skilled mechanic. The belt 31 forming the conveyor proper is of flexible steel band form fitted over the mounting pulleys 14 and 16 before referred to and suitably tensioned.

The conveyor could also be formed by chains or other means suited to the purpose.

The cutter carriers 32 are of rectangular block-like form having a cavity 33 extending in from the top and passing from end to end and arranged on the belt 31 by passing the latter through a slot 34 leading from side to side in the lower portion of the carrier, and a clamping gib 35 secured thereunder by screws 36 and grips said belt 31 as shown in FIGURE 3A. By this arrangement the carriers 32 can be adjusted at any required position along the belt 31. Other locking means between the belt and the cutter carriers such as flanged clamps and the like could be used, and the invention is not limited to this precise form of a fixture.

At the front and back of the carriers 32 there are blocks 36A preferably of nylon which are held in place by screws as seen in FIGURES 1 and 3 and can be readily renewed if necessary and constitute abutment blocks.

At the rear the carriers 32 contact in sliding relation (as best shown in FIGURE 3) a guide plate 37 affixed to the conveyor frame in any suitable manner, while at the front they slide on the blocks 36A over an angle tray-like guide 38 supported from the mentioned frame structure by one or more adjustable brackets 39, one of which is seen in FIGURE 1.

The cutter cells 40 (see FIGURE 3 for details) are each formed with a bar-like arm end 41 and have a slot 42 therethrough in which a cutter 43 is rotatably mounted on a ball bearing indicated at 44 in dotted lines. Each cell 40 is fitted in the cavity 33 of a carrier 32 and pivoted at the rear end by a transverse pin 45 while at the front the arm end 41 is fitted with a cam roller 46 which projects outwardly. A coiled spring 47 (forming the spring loading) is arranged under each arm end 41 and located in position by pins in the underside of the related arm end and the floor of the cavity 33.

The cutters 43 have a sharpened edge suited to their purpose and project from their slot 42 at the upper portion to expose sufficient area for the cutting operation.

These cam rollers 46 are adapted to contact a contoured face 48 on the underside of a cam track 49 which is carried on posts 50 extending from the front guide 38 and is affixed in a vertically adjustable manner by screws 51 passing through vertically elongated slots 52. A locking set screw 53 is provided at the top of each post 50.

The cam track face 48 as seen in FIGURE 1, is so contoured that as the cutter carriers 32 pass forward on the upper side of the conveyor 15 along the front guide 38 the cam rollers 46 on the arm ends 41 being kept in contact with the cam face 48 by springs 47 urging the arm 41 upward, each cell starts to swing out of its cavity carrying with it its cutter 43 so that when the medial point of the upward curvature of the said cam face 48 is reached the cutting operation is completed, after which the related cell 40 commences to retract and so the next cutter 43 is brought into operation and so on. The distance between the cutting operations is equal to the amount by which the formed tube 6 is advanced on the mandrel 5. The tube 6 is spirally formed on the primary mandrel 4 by suitable means well known in the art. The winder B illustrated in FIGURE 1 has a drive belt 60 trained about the driving hubs 61 which are in turn driven by the motor 54. One run of the belt is passed around the primary mandrel 4 as illustrated at 60–a and the elongated strips of material (not shown) which are being wound into tubes in the conventional spiral winding operation are fed onto the mandrel and under the portion of the belt 60–a.

The motor indicated at 54 on the tube winder B is synchronized as to its speed with that of the drive motor (not shown) on the cutting machine by electronic means in well known manner.

Returning to the conveyor belt 31, it will be seen from the drawings that there are a series of spacer blocks 55 fitted on said belt 31 between the cutter carriers 32, and these are threaded onto said belt 31 and secured thereto in similar manner to said cutter carriers 32. Said spacer blocks 55 control the flexibility of the conveyor belt 31 between the cutter carriers 32.

In some cases the speed of travel of the conveyor 15 may be controlled by light sensitive cell means or other electronically controlled devices of known form actuated by the registering of printed or other markings on the tube 6 and thereby effecting the severing of such tube 6 at predetermined positions.

I claim:

1. A tube cutting machine for use with a spiral tube winder of the type having a winding mandrel, said machine comprising a support disposed at the delivery end of said winder, an endless conveyor assembly mounted on said support and having a straight line run thereof disposed in spaced parallel relation to the projected axis of the winding mandrel; a cutoff mandrel forming an axial extension of the winder mandrel to receive the tube wound on said winding mandrel and progressively delivered therefrom, a plurality of cutters mounted on said conveyor in precisely spaced apart relation, each cutter lying in a plane disposed transversely to the axis of the cutoff mandrel and being rotatable on an axis parallel to said cutoff mandrel, and when traveling along the straight line run of said conveyor, the mounting of each cutter on the conveyor being such as to permit shifting each cutter into and out of cutting position with respect to the tube moving along the axis of the cutoff mandrel, actuating means positively shifting each cutter into and out of cutting position only when the cutters are moving along the straight line run of said conveyor, means for driving said conveyor at a speed synchronized with the speed of axial travel of the tube moving on the cutoff mandrel and roller means disposed in generally opposed relation to the straight line run of said endless conveyor assembly and spaced above the circumference of the cutters when in cutting position a distance equal to the outside diameter of the tube being wound less the thickness of the tube wall to positively position the tube during the cutting operation.

2. The structure set forth in claim 1 and means for positively rotating said cutoff mandrel at the speed of rotation of the tube being delivered from the winding mandrel.

3. The structure set forth in claim 1 and said endless conveyor assembly including an endless steel belt and each of said cutters including a cutter carrier having removable means for adjustably securing said carrier and cutter in the desired spaced relation with respect to the adjacent cutters.

4. The structure set forth in claim 1 and a pair of spaced apart pulleys around which said belt is trained, the axis of one of said pulleys being shiftable for adjusting the tension in said belt.

5. The structure set forth in claim 1 and means for vertically adjusting the conveyor assembly with respect to the cutoff mandrel.

6. The structure set forth in claim 1 and spring means normally urging each of said cutters toward said mandrel with cam means for positively positioning the cutter with respect to said mandrel.

(References on following page)

References Cited by the Examiner

UNITED STATES PATENTS

| | | | |
|---|---|---|---|
| 1,093,380 | 4/1914 | Brach | 83—326 |
| 1,348,636 | 8/1920 | Fretter | 82—100 |
| 1,413,191 | 4/1922 | Roland | 82—53.1 X |
| 1,641,866 | 7/1925 | Roberts | 82—56 X |
| 1,666,203 | 4/1928 | Harshberger | 83—326 X |
| 1,740,430 | 12/1929 | Mudd | 82—53.1 X |
| 1,913,153 | 6/1933 | De Salardi | 83—365 |
| 2,580,959 | 1/1952 | Ropp et al. | 83—76 |
| 2,939,354 | 6/1960 | King | 83—365 X |

WILLIAM W. DYER, Jr., *Primary Examiner.*

RICHARD H. EANES, Jr., D. SCHMIDT, *Examiners.*